(12) United States Patent
White

(10) Patent No.: US 8,713,608 B2
(45) Date of Patent: Apr. 29, 2014

(54) SYSTEM FOR PRESENTING MEDIA SERVICES

(75) Inventor: Scott White, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1399 days.

(21) Appl. No.: 11/776,999

(22) Filed: Jul. 12, 2007

(65) Prior Publication Data

US 2009/0019507 A1  Jan. 15, 2009

(51) Int. Cl.
*G06F 3/00* (2006.01)
*G06F 13/00* (2006.01)
*H04N 5/445* (2011.01)

(52) U.S. Cl.
USPC .................................. 725/51; 725/42; 725/53

(58) Field of Classification Search
USPC ........................................................... 725/51
See application file for complete search history.

(56) References Cited

U.S. PATENT DOCUMENTS

| | | | |
|---|---|---|---|
| 5,956,716 A * | 9/1999 | Kenner et al. ......................... 1/1 |
| 6,567,980 B1 * | 5/2003 | Jain et al. ......................... 725/61 |
| 7,162,697 B2 * | 1/2007 | Markel ........................ 715/717 |
| 7,360,152 B2 * | 4/2008 | Capps et al. ................... 715/201 |
| 8,218,764 B1 * | 7/2012 | Kline ............................. 380/215 |
| 8,307,392 B2 * | 11/2012 | Ahanger et al. ................. 725/36 |
| 8,397,266 B2 * | 3/2013 | Gallo et al. ..................... 725/110 |
| 8,453,175 B2 * | 5/2013 | Reid et al. ........................ 725/45 |
| 8,494,907 B2 * | 7/2013 | Lerman et al. ............. 705/14.73 |
| 2002/0112247 A1 * | 8/2002 | Horner et al. ................. 725/112 |
| 2002/0162120 A1 * | 10/2002 | Mitchell ........................ 725/135 |
| 2003/0074660 A1 * | 4/2003 | McCormack et al. ............ 725/2 |
| 2004/0045040 A1 * | 3/2004 | Hayward ....................... 725/135 |
| 2004/0117846 A1 * | 6/2004 | Karaoguz et al. ............. 725/134 |
| 2004/0261040 A1 * | 12/2004 | Radcliffe et al. ............. 715/840 |
| 2006/0271977 A1 * | 11/2006 | Lerman et al. .................. 725/88 |
| 2007/0240192 A1 * | 10/2007 | Acharya et al. ................. 725/87 |
| 2008/0066107 A1 * | 3/2008 | Moonka et al. .................. 725/42 |
| 2008/0162670 A1 * | 7/2008 | Chapweske et al. .......... 709/219 |
| 2008/0240675 A1 * | 10/2008 | Berger et al. .................... 386/66 |
| 2008/0256451 A1 * | 10/2008 | Chu et al. ....................... 715/722 |
| 2008/0281689 A1 * | 11/2008 | Blinnikka et al. .............. 705/14 |

FOREIGN PATENT DOCUMENTS

| | | |
|---|---|---|
| KR | 20040039570 | 5/2004 |
| WO | 03032504 | 4/2003 |

* cited by examiner

*Primary Examiner* — Brian T Pendleton
*Assistant Examiner* — Jonathan V Lewis
(74) *Attorney, Agent, or Firm* — Guntin & Gust, PLC; Douglas Schnabel

(57) ABSTRACT

A system for presenting media services is disclosed. A system that incorporates teachings of the present disclosure may include, for example, a portal having a controller element to detect an installation of an Internet Protocol Television (IPTV) media receiver in an IPTV media system and adapt at least a portion of the portal according to the installation. Other embodiments are disclosed.

17 Claims, 4 Drawing Sheets

400

SYSTEM FOR PRESENTING MEDIA SERVICES

FIELD OF THE DISCLOSURE

The present disclosure relates generally to media services and more specifically to a system for presenting media services.

BACKGROUND

When remotely accessing media files such as music or video, the recipient of a media stream can encounter interoperability issues that can arise from media player dependencies. For example, the recipient may not be able to view and/or listen to the streamed media content because the user lacks a specific application (e.g., QuickTime™, Windows Media Player™, Real Player™, etc.) or has a misconfigured application.

A need therefore arises for a system for presenting media services.

DETAILED DESCRIPTION

Broadly stated, embodiments in accordance with the present disclosure provide a system for presenting media services.

In one embodiment of the present disclosure, a computer-readable storage medium can have computer instructions for receiving a request from an Internet browser of a communication device to remotely navigate through one or more media files stored in a Set-Top Box (STB), establishing communications with the STB, presenting the one or more media files at the Internet browser, receiving from the Internet browser a selection of the one or more media files, directing the STB to transmit a media stream corresponding to the selected media file, receiving from the STB the media stream, and supplying to the Internet browser of the communication device an embedded media player for presenting the media stream.

In one embodiment of the present disclosure, a communication device can have a controller element to activate an Internet browser, submit by way of the Internet browser a request to a web server to navigate through one or more media files stored in an STB accessible by the web server, receive from the web server information associated with the one or more media files, present by way of the Internet browser said information, submit to the web server a selection associated with the one or more media files, receive a media stream from the web server associated with the selection, and present the media stream by way of a Graphical User Interface (GUI) of the Internet browser.

In one embodiment of the present disclosure, a computer-readable storage medium associated with an Internet browser can have computer instructions for submitting a request to a web server to navigate through one or more media files stored in an STB accessible by the web server, presenting information associated with the one or more media files received from the web server, submitting to the web server a selection associated with the one or more media files, receiving a media stream from the web server associated with the selected media file, and presenting the media stream by way of a GUI.

In one embodiment of the present disclosure, an STB can have a controller element to transmit a media stream to a web server that presents an embedded media player at a GUI of an Internet browser for presenting the streamed media.

In one embodiment of the present disclosure, a gateway can have a controller element to establish communications between a web server and an STB, wherein the established communications enable the STB to transmit a media stream to the web server which in turn presents an embedded media player at a GUI of an Internet browser for presenting the streamed media.

Figure 1:
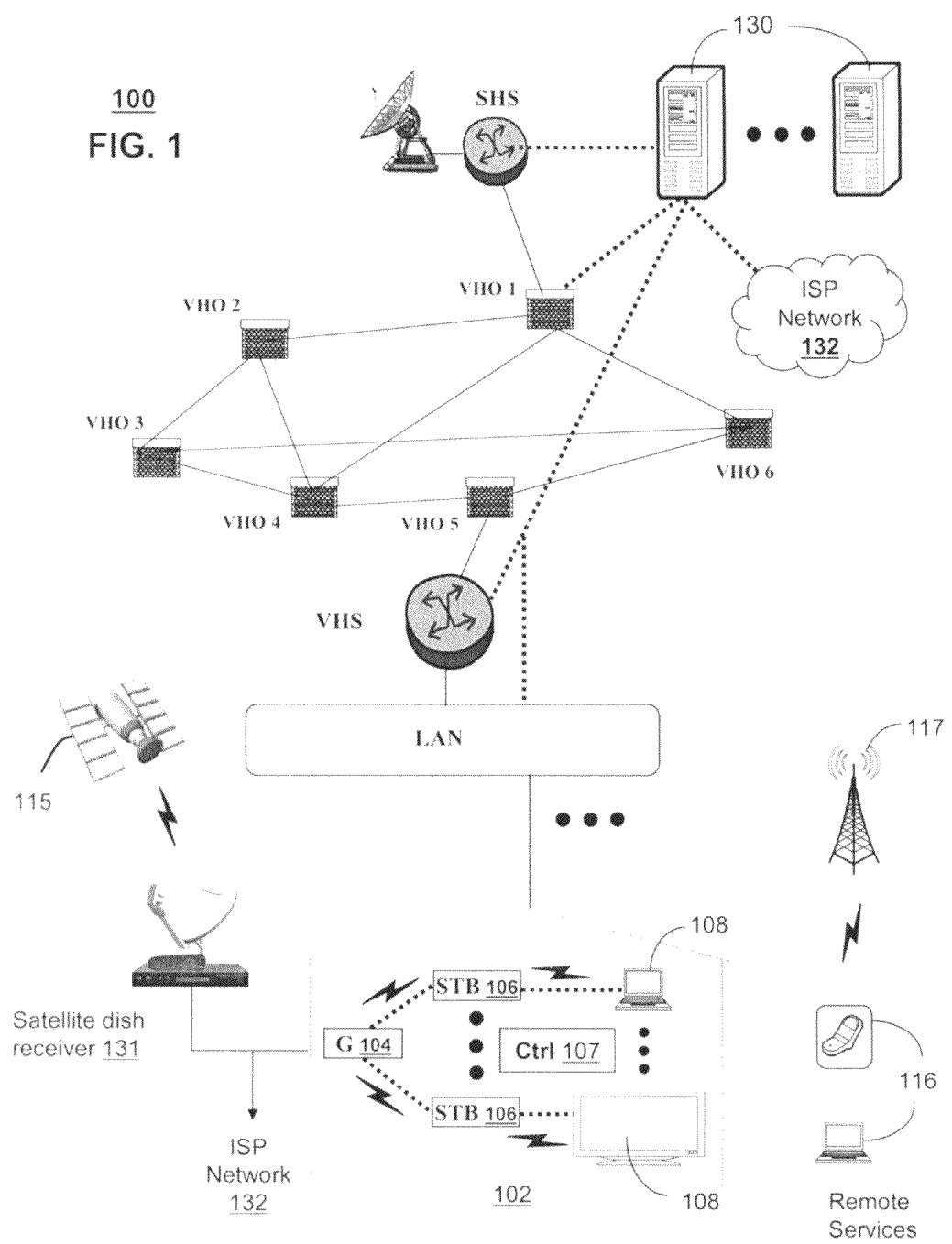
FIG. 1 depicts an exemplary embodiment of a communication system.

FIG. 1 depicts an exemplary embodiment of a communication system 100. The communication system 100 can represent an IPTV broadcast media system. In a typical IPTV infrastructure, there is at least one super head office server (SHS) which receives national media programs from satellite and/or media servers from service providers of multimedia broadcast channels. The SHS server forwards IP packets associated with the media content to video head servers (VHS) via a network of video head offices (VHO) according to a common multicast communication method.

The VHS then distributes multimedia broadcast programs to commercial and/or residential buildings 102 housing a gateway 104 (e.g., a residential gateway or RG). The gateway 104 distributes broadcast signals to media receivers 106 such as Set-Top Boxes (STBs) which in turn present broadcast selections to media devices 108 such as computers or television units managed in some instances by a media controller 107 (e.g., an infrared or RF remote control). Unicast traffic can also be exchanged between the media receivers 106 and subsystems of the IPTV media system for services such as video-on-demand (VoD).

The IPTV media system can be coupled to one or more computing devices 130 that can operate as a web server for providing portal services over an Internet Service Provider (ISP) network 132 to fixed media devices 108 or portable communication devices 116 by way of a wireless base station 117 such as in a cellular communication network operating with common protocols (GSM, CDMA, etc.).

A satellite broadcast system can be used in place of the IPTV media system. In this embodiment, signals transmitted by a satellite 115 can be intercepted by a satellite dish receiver 131 coupled to building 102 which conveys media signals to the media receivers 106. The media receivers 106 can be equipped with a broadband port to the ISP network 132. Although not shown, the communication system 100 can also be combined or replaced with analog or digital broadcast distributions systems such as cable systems. It would be apparent therefore to one of ordinary skill in the art that the present disclosure can be applied to any broadcast media system.

Figure 2:
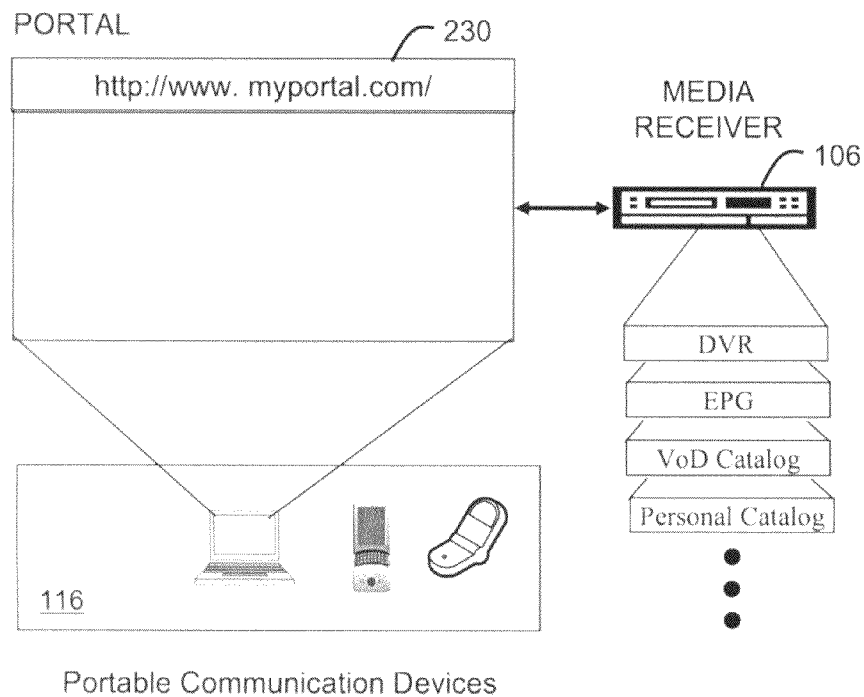
FIGS. 2-3 depict exemplary embodiments of a portal of the communication system.
Figure 3:
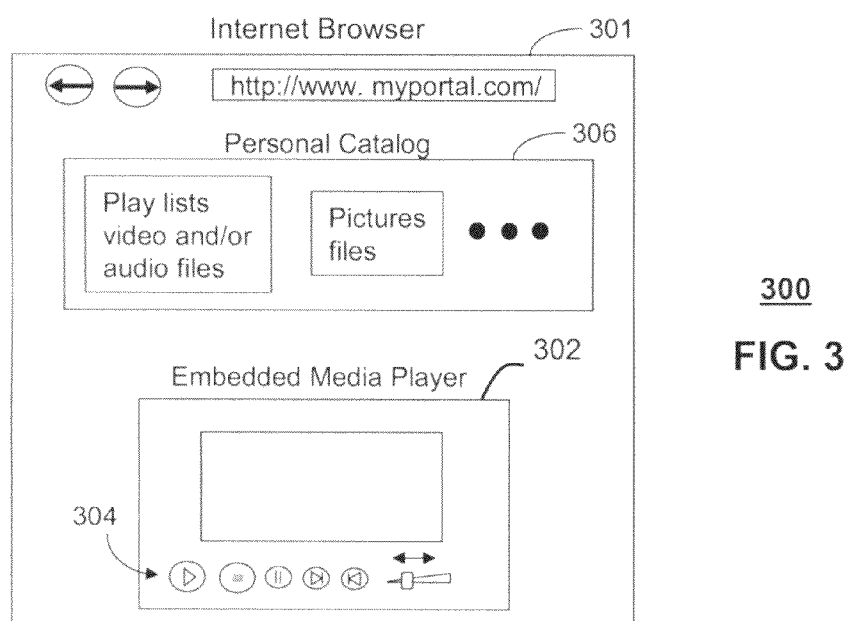

FIGS. 2-3 depict exemplary embodiments of a portal 230 of the communication system 100. In FIG. 2, the portal 230 can be accessed by a URL with a common browser such as Microsoft's Internet Explorer. The portal 230 can be configured to access a media receiver 106 such as the STB of FIG. 1 and services managed thereby such as a Digital Video Recorder (DVR), an Electronic Programming Guide (EPG), Video on Demand (VoD) catalog, a personal catalog stored in the STB (e.g., personal videos, pictures, audio recordings, etc.), and so on by way of the gateway 104. FIG. 3 also depicts an embedded media player 302 presented by the computing device 130 (or web server) of the communication system 100.

The embedded media player 302 can utilize common technology for presenting streamed media supplied by the media receiver 106. The streamed media can be audio only, video only, and combinations thereof that can be managed by GUI elements that control the operation of the embedded media player 302. A control interface of the embedded media player 302 can include for example a play button, a rewind or fast rewind button, a forward or fast forward button, a stop button, a pause button, and a volume control. The personal catalog 306 referred to earlier is illustrated in FIG. 3 as a GUI window of the Internet browser 301. The media files presented in this window can be selected by common means provided by common Internet browsers (e.g., mouse pointer with a selection button). The media files can include audio, video, or still image files. Moreover, the media files can be organized in albums, play lists or other suitable formats.

Figure 4:
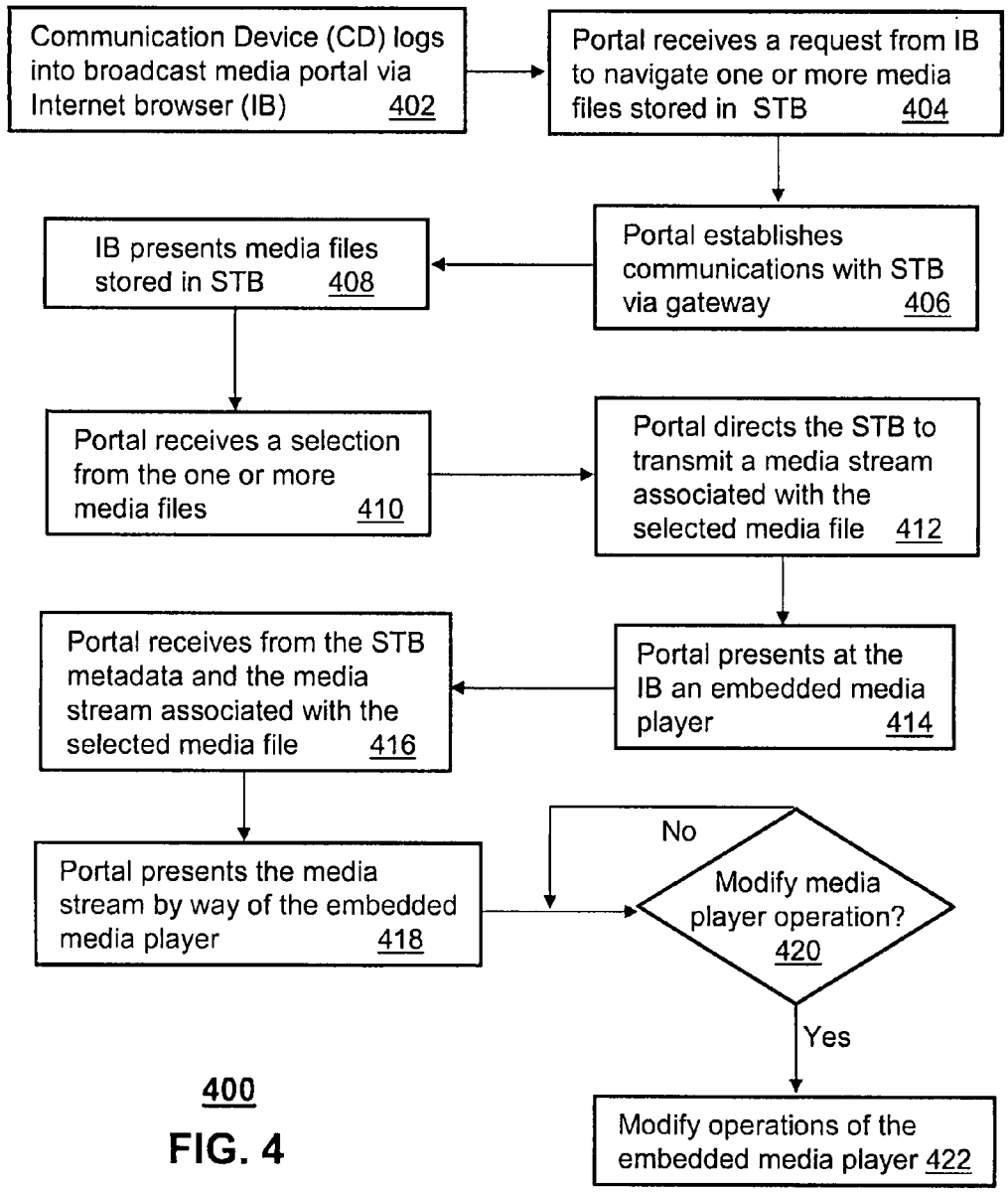
FIG. 4 depicts an exemplary method operating in portions of the communication system.

FIG. 4 depicts an exemplary method 400 operating in portions of the communication system 100. Method 400 begins with step 402 in which a portable communication device 116 roaming the communication system 100 of FIG. 1 (e.g., a cell phone or lap top) logs into a broadcast media portal 230 via an Internet browser 301. The computing devices 130 operate as a web server of the broadcast media portal which serve a multiplicity of subscribers of the IPTV, satellite, and/or cable system depicted by FIG. 1. The portable 230 can be accessed by common means (e.g., URL) and a subscriber account can be identified by a user's login information (e.g., username and password).

Once a subscriber has logged in, the portal 230 can be programmed to detect in step 404 a request from the Internet browser 301 to navigate one or more media files stored in the media receiver 106 (e.g., STB) associated with the subscriber. The request can arise from a selection of a GUI element in the portal 230 (e.g., a hypertext link or icon associated with the STB). In response to said request, the portal 230 can be programmed in step 406 to establish communications with the STB by way of the gateway 104 using a unicast channel of the IPTV network, or the ISP network 132. In this step, the portal 230 can supply authentication information to the gateway 104 to provide secure access to the STB 106. In step 408, the Internet browser 301 receives HTML information from the portal 230 for presenting the media files stored in the STB as shown by way of example by the personal catalog 306 of FIG. 3. The portal 230 can receive from the Internet browser 301 in step 410 a selection from the one or more media files stored in the STB. The selection can be the result of a subscriber pointing a mouse arrow at a particular media file and "double clicking" it to indicate a request for presentation of the selected media file.

In step 412, the portal 230 directs the STB to transmit a media stream associated with the selected media file responsive to the selected media file corresponding to an audio and/or video media file. Concurrently or subsequent to step 412, the portal 230 in step 414 presents at the Internet browser 301 the embedded media player 302. In step 416 the portal 230 receives from the STB metadata (if available) of the media file and the media stream associated therewith. The presentation can take place by way of a graphical user interface (GUI) window of the Internet browser 301 that can include among other things a video or still image presentation with text derived from the metadata (e.g., name of video, song, genre, actor names, media duration, media file date, etc.).

The portal 230 can be programmed in step 420 to modify in step 422 the operation of the media player 302 when detecting a selection associated with the GUI control elements (e.g., play, pause, fast forward, volume control, etc.). By selecting the play button of the embedded media player 302 the portal 230 begins to transmit the media stream to the embedded media player for presentation. Selecting the pause button ceases presentation of the streamed media, fast forward skips portions of the media program, and so on.

The embedded media player 302 of the portal 230 provides subscribers of the communication system 100 a desirable means to present media files stored in an STB 106. In particular method 300 illustrates a means to remotely present media files of the STB 106 in a manner that substantially overcomes interoperability issues encountered by prior art systems that depend on media player applications and proper settings thereof.

Upon reviewing the aforementioned embodiments, it would be evident to an artisan with ordinary skill in the art that said embodiments can be modified, reduced, or enhanced without departing from the scope and spirit of the claims described below. For example, the media stream supplied by the STB can be buffered by the portal 230 in which case the embedded media player 302 can be presented in an initial state requiring the subscriber to hit the play button to start playing the media file. Alternatively, the portal 230 can redirect the media stream to the embedded media player 302 initially and start playing the media stream the moment it arrives from the STB 106. In this latter embodiment, buffering of the media stream can be performed by the portal 230 responsive to a pause or other control signal generated by the embedded media player 302 based on a selection made by the subscriber (e.g., rewind, forward, etc.).

Additionally, the portal 230 can be programmed to apply common transcoding techniques to the streamed media to adapt it to the operational capabilities of the portable communication device 116. This can include adapting the Quality of Service (QoS) of the streamed media, display sizing, resolution, and so on. Method 400 can also be modified so that instead of the STB streaming a media file to the portal 230, the media file is retrieved by the portal from the STB and processing resources of the portal are used to stream the media file to the communication device 116.

These are but a few examples of modifications that can be applied to the present disclosure without departing from the scope of the claims. Accordingly, the reader is directed to the claims section for a fuller understanding of the breadth and scope of the present disclosure.

Figure 5:
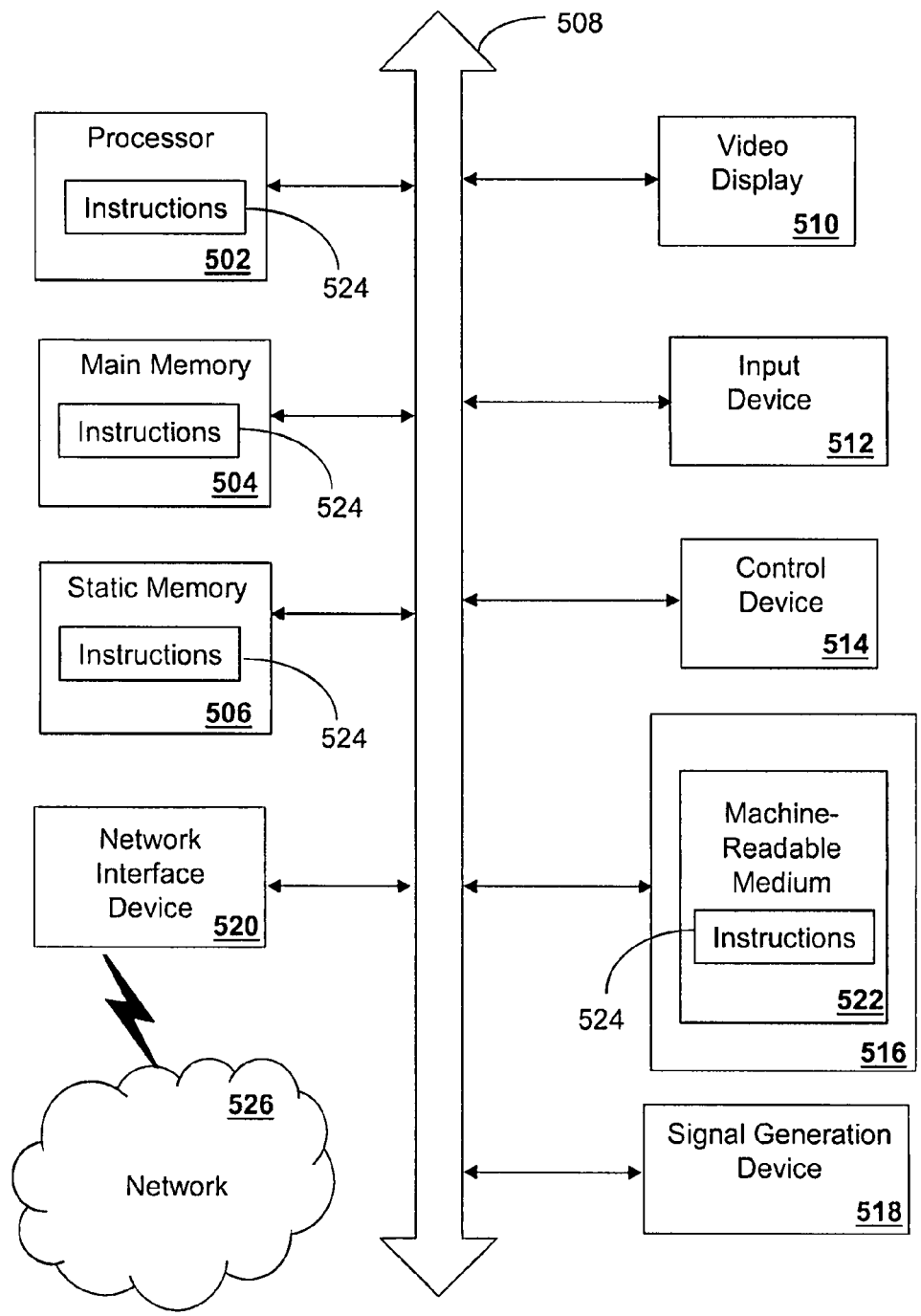
FIG. 5 is a diagrammatic representation of a machine in the form of a computer system within which a set of instructions, when executed, may cause the machine to perform any one or more of the methodologies discussed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium, comprising computer instructions for:
   receiving at a web server a request from an Internet browser of a communication device to remotely navigate through one or more media files stored in a Set-Top Box;
   presenting the one or more media files at the Internet browser in a personal catalog of media files;
   receiving at the web server from the Internet browser a selection of the one or more media files from the personal catalog of media files; and
   responsive to receiving the selection of the one or more media files, automatically:
      supplying an embedded media player to the Internet browser;
      directing the set-top box to transmit to the web-server a real-time media stream corresponding to the selected media file: and
      beginning presentation of the media stream on the embedded media player at the Internet browser.

2. The non-transitory computer-readable storage medium of claim 1, wherein the selected media file comprises at least one among an audio media file, a video media file, and a still image media file, and wherein the portal utilizes Hypertext Markup Language for presenting content at the Internet browser.

3. The non-transitory computer-readable storage medium of claim 1, wherein the one or more media files are organized according to one among one or more still image albums, one or more video albums, and one or more audio albums, and wherein at least one of the audio albums comprises a play list.

4. The non-transitory computer-readable storage medium of claim 1, comprising computer instructions for:
   receiving from the set-top box metadata associated with the selected media file; and
   presenting the metadata at a Graphical User Interface of the Internet browser.

5. The non-transitory computer-readable storage medium of claim 4, wherein the metadata comprises at least one among a play list of other media files, an album description associated with the selected media file, a name given to the selected media file, a date or time associated with the selected media file, a playback duration of the media file, and identification information of one or more media artists associated with the selected media file.

6. The non-transitory computer-readable storage medium of claim 1, wherein the request to remotely navigate is received from the communication device when the communication device is roaming in a long-range communication network, wherein the communication device is configured for voice communications over the long-range communication network, and wherein the embedded media player has one or more selectable graphical user interface elements for controlling operations thereof.

7. The non-transitory computer-readable storage medium of claim 6, comprising computer instructions for:
   receiving a selection of the one or more selectable graphical user interface elements; and
   modifying operation of the embedded media player responsive to the selection.

8. The non-transitory computer-readable storage medium of claim 6, wherein the one or more selectable graphical user interface elements comprise at least one among a play graphical user interface element, a rewind graphical user interface element; a forward graphical user interface element, a fast rewind graphical user interface element, a fast forward graphical user interface element, stop graphical user interface element, and pause graphical user interface element.

9. The non-transitory computer-readable storage medium of claim 1, wherein the web server is associated with a broadcast media communication system, and wherein the request to remotely navigate is received at the web server.

10. The non-transitory computer-readable storage medium of claim 1, comprising computer instructions for:
    supplying authentication information to a gateway coupled to the set-top box; and
    establishing communications with the set-top box upon a successful authentication step with the gateway.

11. A communication device, comprising:
    a memory; and
    a controller element to:
       activate an Internet browser;
       submit by way of the Internet browser a request to a web server to navigate through one or more media files stored in a Set-Top Box accessible by the web server;
       receive from the web server information associated with the one or more media files presented as a personal catalog of media files;
       present by way of the Internet browser said information;
       submit to the web server a selection associated with the one or more media files and selected from the personal catalog of media files; and
       responsive to submitting the selection, automatically;
          receive from the web server an embedded media player for the Internet browser;
          receive a real-time media stream originating from the STB by way of the web server associated with the selection; and
          present the real-time media stream on the embedded media player at the Internet browser.

12. The communication device of claim 11, wherein the selected media file comprises at least one among an audio media file, a video media file, and a still image media file, and wherein the one or more media files are organized according to one among one or more still image albums, one or more video albums, and one or more audio albums, and wherein at least one of the audio albums comprises a play list.

13. The communication device of claim 11, wherein the controller element: receives from the set-top box metadata associated with the selected media file; and
    presents the metadata at the graphical user interface of the Internet browser.

14. The communication device of claim 13, wherein the metadata comprises at least one among a play list of other media files, an album description associated with the selected media file, a name given to the selected media file, a date or time associated with the selected media file, a playback duration of the media file, and identification information of one or more media artists associated with the selected media file.

15. The communication device of claim 11, wherein the controller element presents at the graphical user interface of the Internet browser an embedded media player of the web server with one or more selectable graphical user interface elements for controlling operations of the embedded media player, wherein the request to navigate is submitted when the communication device is roaming in a long-range communication network, and wherein the communication device is configured for voice communications over the long-range communication network.

16. The communication device of claim 15, wherein the controller element:
- receives a selection of the one or more selectable graphical user interface elements; and
- modifies operation of the embedded media player responsive to the selection.

17. The communication device of claim 15, wherein the one or more selectable graphical user interface elements comprise at least one among a play graphical user interface button, a rewind graphical user interface button; a forward graphical user interface button, a fast rewind graphical user interface button, and a fast forward graphical user interface button.

* * * * *